(12) United States Patent
Nakamura

(10) Patent No.: US 7,757,740 B2
(45) Date of Patent: Jul. 20, 2010

(54) FILM-AFFIXING DEVICE

(75) Inventor: Masahiro Nakamura, Saitama (JP)

(73) Assignee: Lintec Corporation, Tokyo (JP)

( * ) Notice: Subject to any disclaimer, the term of this patent is extended or adjusted under 35 U.S.C. 154(b) by 109 days.

(21) Appl. No.: 11/970,725

(22) Filed: Jan. 8, 2008

(65) Prior Publication Data

US 2008/0099152 A1    May 1, 2008

Related U.S. Application Data

(63) Continuation of application No. 11/001,034, filed on Dec. 2, 2004, now Pat. No. 7,374,630.

(30) Foreign Application Priority Data

Dec. 3, 2003    (JP)    ............... P2003-404499

(51) Int. Cl.
*B32B 38/10*    (2006.01)
*B65C 9/18*    (2006.01)
*B65C 9/26*    (2006.01)

(52) U.S. Cl. .............. 156/542; 156/249; 156/344; 156/541; 156/584; 269/3; 294/137

(58) Field of Classification Search ............ 156/344, 156/584, 247, 249, 541, 542; 269/3; 294/137, 294/170
See application file for complete search history.

(56) References Cited

U.S. PATENT DOCUMENTS

| 2,703,660 | A | * | 3/1955 | Von Hofe et al. ........... 156/364 |
| 3,190,785 | A | | 6/1965 | Comet |
| 3,547,744 | A | | 12/1970 | Buchaklian |
| 4,648,930 | A | | 3/1987 | La Mers |
| 4,859,275 | A | | 8/1989 | Sueda et al. |
| 5,624,525 | A | | 4/1997 | Ehara et al. |
| 6,200,402 | B1 | | 3/2001 | Amo |
| 6,752,191 | B2 | | 6/2004 | Maeda |
| 7,089,986 | B2 | | 8/2006 | Hayasaka et al. |
| 2003/0116274 | A1 | * | 6/2003 | Kitano et al. ............... 156/344 |

FOREIGN PATENT DOCUMENTS

| EP | 1393930 | 3/2004 |
| GB | 2205303 | 12/1988 |
| JP | 7-040434 | 2/1995 |
| JP | 7-323953 | 2/1995 |

OTHER PUBLICATIONS

English language Abstract of JP 7-040434.
English language Abstract of JP 7-323953.

* cited by examiner

*Primary Examiner*—Mark A Osele
(74) *Attorney, Agent, or Firm*—Greenblum & Bernstein, P.L.C.

(57) ABSTRACT

A film-supplying device is provided for supplying a ring-shape adhesive-film to a film-affixing device having an alignment shaft-member, where the ring-shape adhesive-film is attached on a release sheet. The device comprises a table and a sheet transport mechanism. The release sheet is transported in a predetermined direction on the table by the sheet transport mechanism. The table is provided with an opening. The alignment shaft-member is inserted through the opening. The table is also provided with a peel portion that is used to peel off the ring-shape adhesive-film from the release sheet. Further, the table is provided with a passageway that is formed from the opening to the peel portion, in the predetermined direction.

12 Claims, 10 Drawing Sheets

FILM-AFFIXING DEVICE

This application is a divisional of pending U.S. patent application Ser. No. 11/001,034, filed Dec. 2, 2004, the disclosure of which is expressly incorporated herein by reference in its entirety.

BACKGROUND OF THE INVENTION

1. Field of the Invention

The present invention relates to a film-supplying device that is used for peeling off a pressure-sensitive adhesive-film, such as a protective film for an automobile wheel, from a release sheet to supply the pressure-sensitive adhesive-film to a film-affixing jig or device. Further, the present invention relates to a film-affixing system for the above film-supplying device.

2. Description of the Related Art

A wheel for a vehicle, such as a wheel for an automobile, is shipped after affixing a protective film on its surface, so that the wheel surface is protected from damage or dirt. A pressure-sensitive adhesive-film, used for a protective film, is made from a polypropylene or polyethylene film, of which the thickness is about 20 μm to 100 μm. One side of the protective film is provided with an adhesive layer approximately 10 μm to 30 μm thick, which comprises acrylic or rubber pressure-sensitive adhesive. The adhesive layer is initially covered with a release sheet, which was subjected to treatment for peeling, and thereby protected. The release sheet is peeled off before applying the protective film to an adherend. Since protective films are extremely thin, they can not retain their shape by themselves, so that distortion and wrinkles can easily be produced in the affixing operations of a pressure-sensitive adhesive-film. Therefore, there is great difficulty in carrying out the film-affixing operations by an automaton, so that in most cases, skilled workers manually carry out the above film-affixing operations. However, in recent years, there have been some attempts to provide an automaton for affixing protective film to a wheel. For example, such a system is disclosed in Japanese Laid-Open patent publications (KOKAI) Nos. 7-323953 and 7-40434.

SUMMARY OF THE INVENTION

An object of the present invention is to provide a film-affixing system that is able to peel off a ring-shape adhesive-film (such as a protective film), easily, swiftly, and precisely, from the continuous release-sheet to which the ring-shape pressure-sensitive adhesive-film is releasably attached. Further, an other object of the present invention to provide a film-supplying device, a film-affixing device, and a release sheet which are utilized in the above film-affixing system.

According to an aspect of the present invention, a film-supplying device is provided for supplying a ring-shape adhesive-film to a film-affixing device having an alignment shaft-member, where a ring-shape adhesive-film is attached on a release sheet. The film-supplying device comprises a table and a sheet transport mechanism.

The release sheet is transported in a predetermined direction on the table by the sheet transport mechanism. The table is provided with an opening. The alignment shaft-member is inserted through the opening. The table is also provided with a peel portion that is used to peel off the ring-shape adhesive-film from the release sheet. Further, the table is provided with a passageway that is formed from the opening to the peel portion along the predetermined direction.

According to a further aspect of the invention, the film-affixing device may be put on the ring-shape adhesive-film by inserting the alignment shaft-member into the opening through a cut-out area of the ring-shape adhesive-film.

Further, the film-affixing device on the ring-shape adhesive-film may be transported to the peel portion together with the ring-shape adhesive-film when the release sheet is transported. At this time, the alignment shaft-member may move along the passageway.

According to another aspect of the invention, the release sheet may be provided with a circular hole so that the alignment shaft-member is inserted into the opening through the hole.

According to a further aspect of the invention, the center of the hole formed in the release sheet may be substantially coaxial with the center of the ring-shape adhesive-film attached on the release sheet.

According to a further aspect of the invention, the diameter "D" of the hole may satisfy a formula $D/2 > d/2 + (1+\cos\theta)L/\sin\theta$ when the film-affixing device is put on the ring-shape adhesive-film and where "L" denotes a length from the front end of the alignment shaft-member to a level of the surface of the ring-shape adhesive-film, "d" denotes the maximum diameter of the alignment shaft-member, and "θ" denotes a peel angle at the peel portion.

According to a further aspect of the invention, the peel angle "θ" is set at 90°.

According to another aspect of the present invention, a film-affixing device is provided for affixing a ring-shape adhesive-film that is attached on a release sheet onto an adherend. The film-affixing device comprises a film-supporting mechanism and an alignment shaft-member.

The film-supporting mechanism supports the ring-shape adhesive-film along the periphery of the ring-shape adhesive-film. The alignment shaft-member adjusts a position of the film-affixing device with respect to the adherend. Further, the supporting force of the film-supporting mechanism is enhanced at least at one of a position where the ring-shape adhesive-film starts to peel off from the release sheet, and a position where the peeling off of the ring-shape adhesive-film is completed.

Further, the film-affixing device may comprise a grip and the supporting mechanism may comprise a plurality of adhesive members. The adhesive force of at least one of the plurality of adhesive members in the longitudinal direction of the grip is enhanced compared to the other adhesive members.

According to another aspect of the present invention, a continuous release-sheet comprising a ring-shape adhesive-film is provided.

The ring-shape adhesive-film is supplied to a film-affixing device having an alignment shaft-member. The ring-shape adhesive-film attached on the continuous release-sheet is releasable from the continuous release-sheet. Further, the alignment shaft-member is able to pass through the inside ring of the ring-shape adhesive-films.

Further, the continuous release-sheet may have a hole and the removed area of the ring-shape adhesive-film coincides with the hole.

Further, according to another aspect of the present invention, a film-affixing system is provided that comprises a release sheet, a film-affixing device, and a film-supplying device.

The release sheet is releasably attached on a ring-shape adhesive-film. The film-affixing device is used for affixing the ring-shape adhesive-film, which is peeled off from the release sheet, onto an adherend. The film-supplying device peels off the ring-shape adhesive-film from the release sheet and supplies the ring-shape adhesive-film to the film-affixing device.

Further, the film-affixing device comprises a film-supporting mechanism and an alignment shaft-member. The film-supporting mechanism supports the ring-shape adhesive-film. The alignment shaft-member adjusts a position of the film-affixing device with respect to the adherend. The release sheet comprises a cut-out area for the alignment shaft-member to pass through the inside ring of the ring-shape adhesive-film. The film-supplying device comprises a table where the release sheet is put on and a sheet transport mechanism that transports the release sheet on the table toward a predetermined direction. The table is provided with an opening, through which the alignment shaft-member is inserted. Further, the table comprises a peel portion that peels off the ring-shape adhesive-film from the release sheet. The table also comprises a passageway that is provided from the opening to the peel portion in the predetermined direction.

The film-affixing device is put on the ring-shape adhesive-film by inserting the alignment shaft-member into the opening through the cut-out area. The ring-shape adhesive-film is suspended from the film-affixing device by the film-supporting mechanism. The alignment shaft-member is moved along the inside of the passageway when the release sheet is transported. The film-affixing device, which is put on the ring-shape adhesive-film, is then transported to the peel portion together with the ring-shape adhesive-film. Finally, the alignment shaft-member is extracted through the cut-out area of the release sheet that has already passed through the peel portion, while the alignment shaft-member is transported in the predetermined direction.

BRIEF DESCRIPTION OF THE DRAWINGS

The objects and advantages of the present invention will be better understood from the following description, with reference to the accompanying drawings in which.

DESCRIPTION OF THE PREFERRED EMBODIMENTS

Figure 1:
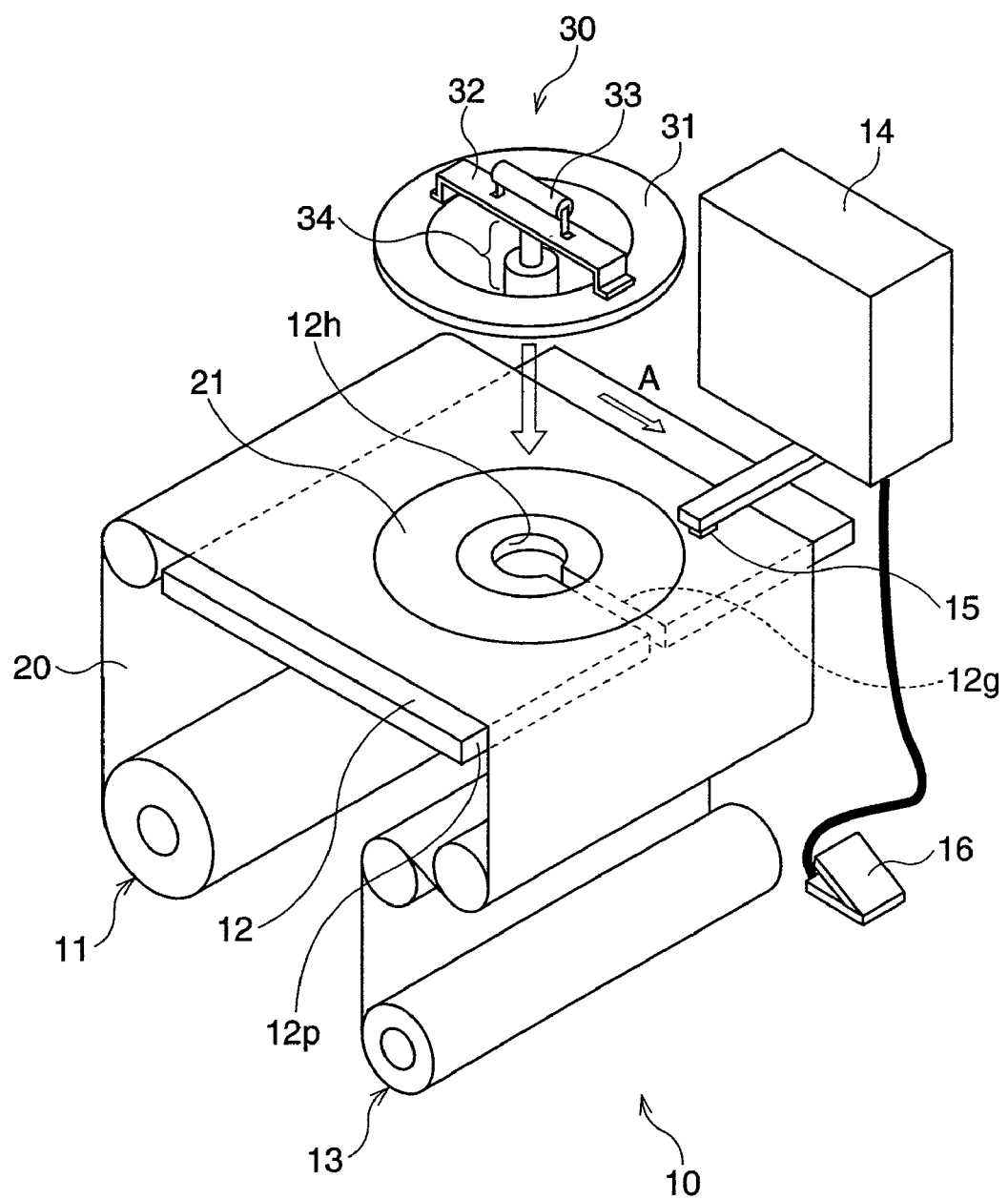
FIG. 1 schematically illustrates a perspective view of a film-affixing system of an embodiment of the present invention.

The present invention is described below with reference to the embodiments shown in the drawings.

Figure 2:
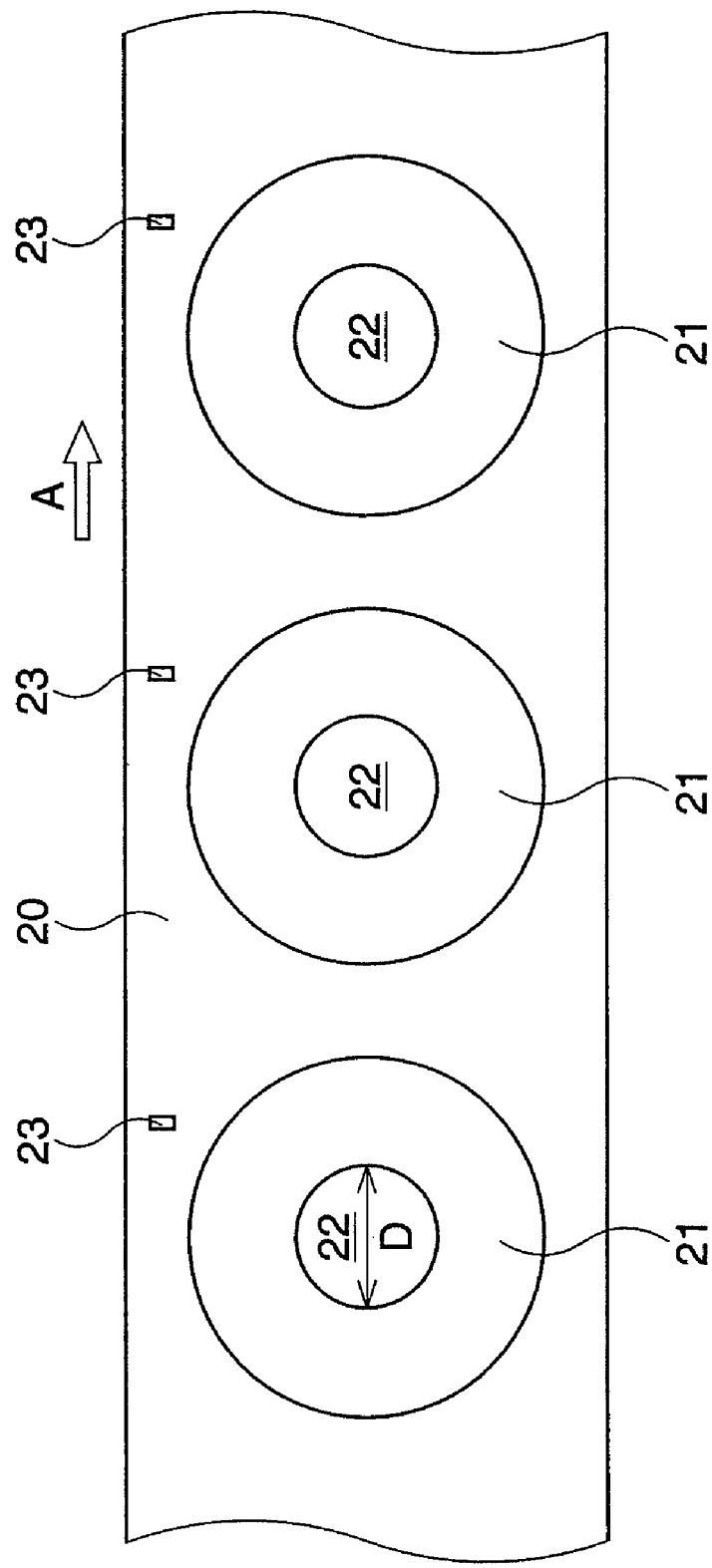
FIG. 2 is a segmentary view of a continuous release-sheet used in the film-affixing system of the present embodiment.

FIG. 1 schematically illustrates a perspective view of a film-affixing system of an embodiment of the present invention. Further, FIG. 2 is a segmentary view of a continuous release-sheet used in the film-affixing system of the present embodiment.

The film-supplying device 10 of the present embodiment is a device for supplying a ring-shape pressure-sensitive adhesive-film 21 (also referred to as a protective film in the following), which is detachably attached on the continuous release-sheet 20, for the film-affixing device 30 of the present embodiment. As shown in FIG. 2, the protective films 21 for a wheel are attached on the continuous release sheet 20 along the longitudinal direction at predetermined intervals. The protective films 21 which are attached on the release sheet 20 are films that are formed in a ring-shape from which a circular area (or a removed area) 22 corresponding to a central part of a wheel (adherend) is extracted. Note that, the circular area of the release sheet 20, which corresponds to the area 22 of the protective film, is also extracted when the area 22 is extracted from the protective film 21. Further, for example, positioning perforations 23 may be formed on one side of the release sheet 20 along the longitudinal direction at predetermined intervals. Furthermore, a certain type of mark may also be used for the positioning purpose, in place of the perforations.

The release sheet 20 is initially spooled and is supported at a sheet-supplying portion 11. The release sheet 20 is drawn out from the sheet-supplying portion 11, and then transported on a table 12. Finally it is wound up at a sheet-windup portion 13. Each of the drawing out operation at the sheet-supplying portion 11 and the windup operation at the sheet-windup portion 13 is carried out by a motor(s) which is (are) not depicted. Further, a controller 14 controls the driving of the motor.

A positioning sensor 15 is provided at predetermined distance above the top surface of the table 12 for positioning the protective film 21 on the table 12, by means of detecting a positioning perforation 23 provided on the release sheet 20. A footswitch 16 is connected to the controller 14, so that when an operator pushes the footswitch 16, the motor is actuated and the release sheet 20 is fed out from the sheet-supplying portion 11. When a protective film 21 is moved to a predetermined position on the table 12 and the positioning sensor 15 detects a positioning perforation 23, a signal from the positioning sensor is transmitted to the controller 14, so that the controller 14 suspends the driving the motor and positions the protective film 21 at the appropriate position on the table 12.

Figure 3:
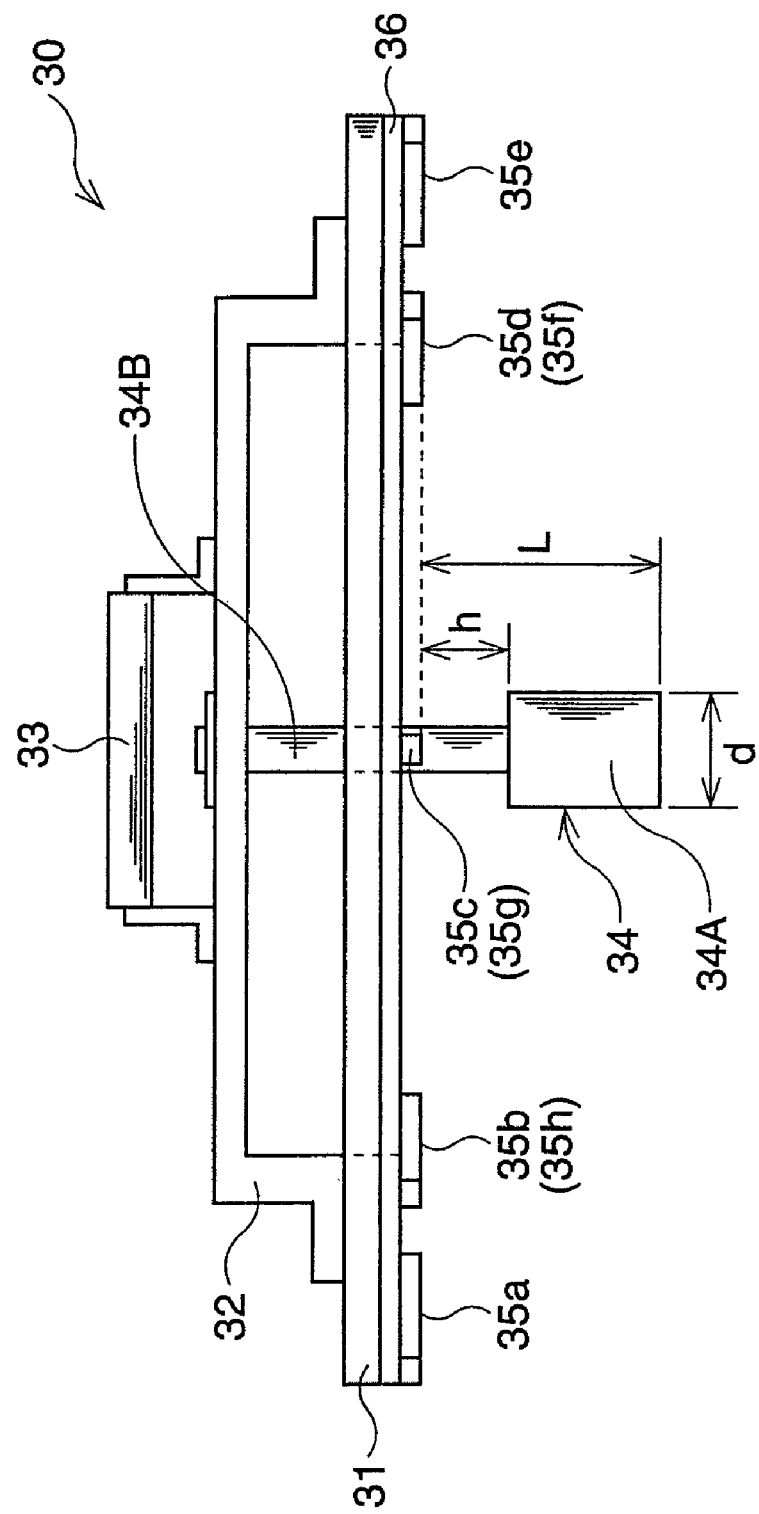
FIG. 3 schematically illustrates a side view of the film-affixing device used in the present embodiment.
Figure 4:
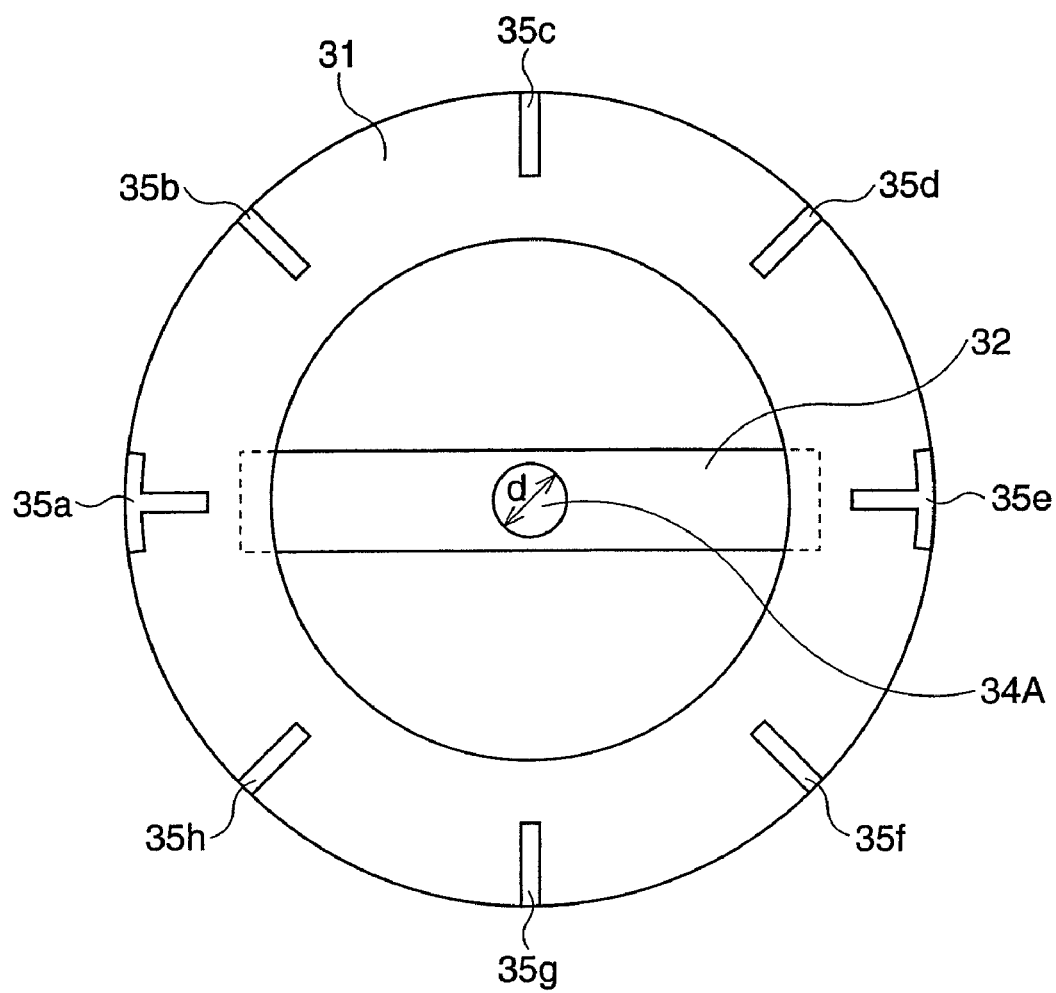
FIG. 4 is a bottom view of the film-affixing device illustrated in FIG. 3.

Respective FIGS. 3 and 4 schematically illustrate a side view and a bottom view of the film-affixing device 30 of the present embodiment.

The film-affixing device 30 includes a ring-shape board member 31 of which the peripheral area is shaped substantially the same as the peripheral area of the ring-shape protective-film 21. A supporting member 32 is provided on the top surface of the ring-shape board member 31 and straddles the center of the ring. A grip 33 for an operator to hold and manipulate the film-affixing device 30 is provided on top of the supporting member 32. Further, under the supporting member 32 and at the location corresponding to the center of the ring-shape board member 31, an alignment shaft-member 34 is provided for alignment of the film-affixing device 30 with a wheel. Namely, the alignment shaft-member 34 extends downwardly from the supporting member 32. The lower end of the alignment shaft-member 34 is formed as a hub-insertion section 34A, whereby the hub-insertion section 34A is inserted into a wheel's hub to establish alignment of the film-affixing device 30 with the wheel when affixing the protective film onto the wheel. Therefore, the dimensions of the hub-insertion section 34A are adjusted to a size that snugly fits with the hub. On the other hand, the upper half section of the alignment shaft-member 34 is formed as a rod member 34B that is connected to the supporting member 32 and may be formed narrower than the hub-insertion section 34A.

On the bottom surface of the ring-shape board member 31, at regular intervals along the circumference, a film-supporting implement including a plurality of adhesive members (e.g., pressure-sensitive adhesive double coated tape) is provided via an elastic member 36 (e.g., sponge) for temporally affixing the protective film 21 onto the film-affixing device 30. In the present embodiment, for example, eight adhesive members 35a-35h are radially attached. The adhesive members 35a and 35e are arranged at the positions where the supporting member 32, which is provided with the grip 33, is attached. Namely, the adhesive members 35a and 35e are located at the positions that are symmetrical with respect to the center of the ring-shape board member 31. The adhesive members 35a and 35e are formed in the shape of letter "T" while the other adhesive members are formed in the shape of letter "I". This is due to the fact that the peeling operation of the protective film 21 from the release sheet 20 is carried out in the direction defined by the segment between the adhesive members 35a and 35e (i.e. the longitudinal direction of the grip 33). Namely, in the peeling operation, the protective film begins to peel off from the side corresponding to one of the adhesive members 35a and 35e, and the operation is completed at the other side. Thereby, the protective film 21 is required to be securely adhered to the film-affixing device 30 at the positions corresponding to the adhesive members 35a and 35e. In the present embodiment, the retaining capability of the adhesive members 35a and 35e for a protective film is enhanced by increasing the size of the adhesive area at these two points by forming the adhesive members 35a and 35e in the shape of the letter "T".

Note that, when affixing the protective film 21 onto a wheel of an automobile and the like, the film-affixing device 30 to which the protective film 21 was affixed is then aligned to the wheel by fitting the alignment shaft-member 34 into the hub of the wheel. Further, the operator presses the grip 33 down against the wheel, so that the ring-shape board member 31 is depressed toward the wheel surface with the elastic member 36 interposed between the ring-shape board member 31 and the wheel surface. The protective film 21 is sandwiched between the ring-shape board member 31 and the wheel surface is adhered to the surface of the wheel by pressure caused by the above depression. Thereafter, the alignment shaft-member 34 is extracted from the hub, such that the film-affixing device 30 moves away from the wheel, while the protective film 21, which has been adhered onto the wheel surface, is detached from the film-affixing device 30. Namely, the adhesive force between the protective film 21 and the adhesive members 35a-35h is required to be set at less than the contact bonding adhesive force of the protective film to the wheel.

Figure 5:
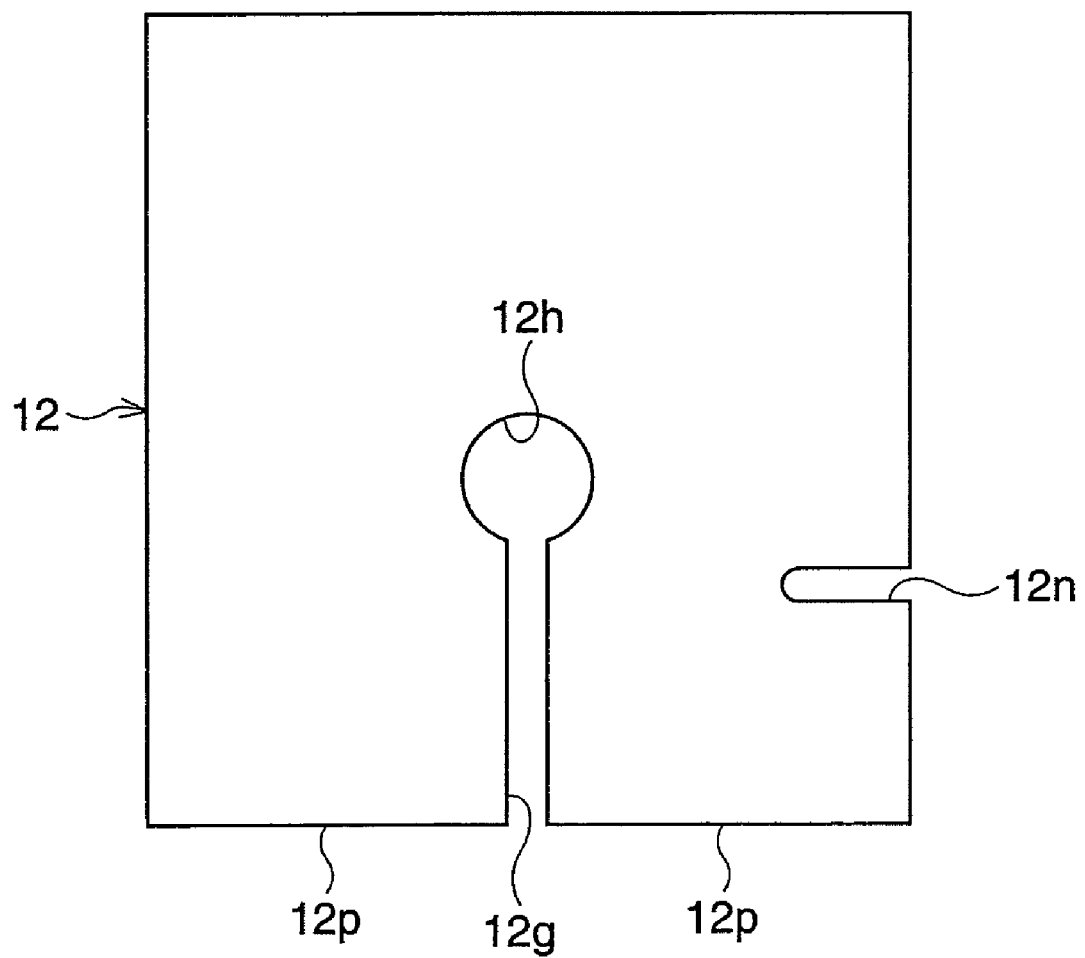
FIG. 5 is a plan view of the table for the film-supplying device of the present embodiment.

With reference to FIG. 5, a plan view of the table 12 is illustrated. The table 12 is substantially formed in the shape of rectangle in this embodiment. For example, a circular opening 12h for inserting the alignment shaft-member 34 is formed in the center of the table 12. The internal diameter of the circular opening 12h is slightly larger than the external diameter "d" of the hub-insertion section 34A in order to enable the hub-insertion section 34A to be inserted through the opening 12h. Further, the circular opening 12h is connected to the external edge of the table 12 through a guide slot (or a passageway) 12g formed in the direction to which the release sheet 20 is transported on the table 12. Namely, as shown in FIG. 5, the opening 12h and the guide slot 12g form a slot which extends from the peel portion 12p of the table 12 to the opening 12h. Note that, the width of the guide slot 12g is slightly larger than the external diameter of the rod member 34B.

Further, a notch 12n may be provided on a side neighboring the side corresponding to the peel portion 12p where the guide slot 12g is formed. The notch 12n is used in relation with the positioning sensor 15 for adjusting the position of a protective film 21. Namely, the notch 12n is formed directly below the positioning sensor 15. For example, when a photo detector is used for the positioning sensor 15, it is structured so that the light irradiated from a light source (not shown) disposed under the table 12 can pass through the notch 12n to be received by the positioning sensor 15. In most situations, the edge of the release sheet 20 blocks off the light, however, when a positioning perforation 23 is aligned between the notch 12n and the positioning sensor 15, the positioning sensor 15 detects the light, so that transportation of the release sheet 20 is suspended. At this point, the center of the protective film 21 is positioned at the center of the circular opening 12h, such that the protective film 21 is positioned properly.

Next, with reference to FIGS. 6 to 8, peeling and affixing operations of the protective film 21 from the release sheet 20 to the film-affixing device 30 using the film-supplying device 10 of the present embodiment will be explained.

Figure 6:
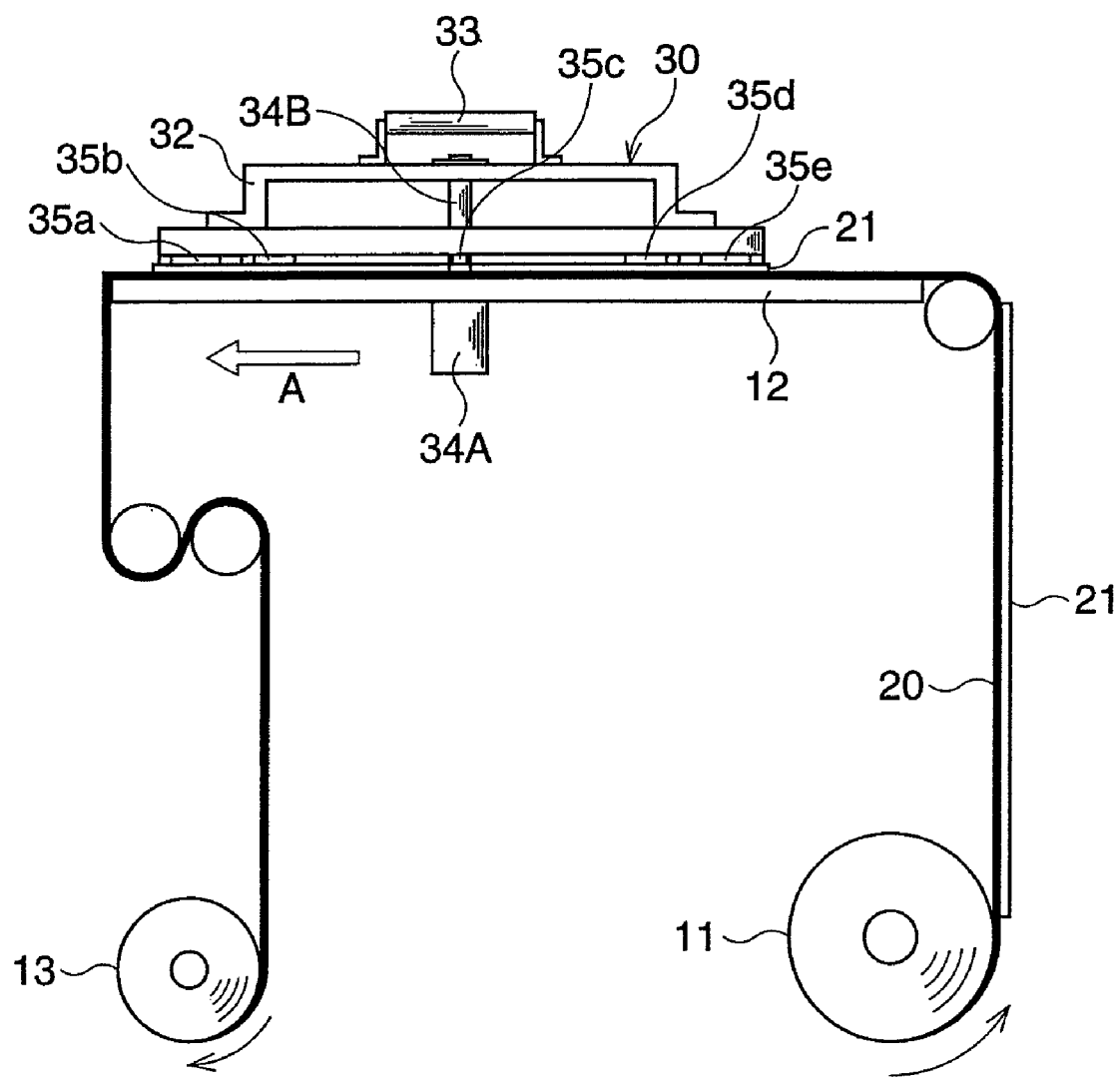
FIG. 6 schematically illustrates a side view of the film-supplying device and the film-affixing device, when the protective film is properly aligned with the circular opening on the table, and when the film-affixing device is put on the table.

FIG. 6 schematically illustrates a side view of the film-supplying device and the film-affixing device, where the film-affixing device 30 has been put on the table 12 with the protective film 21 and the release sheet 20 sandwiched between the film-affixing device 30 and the table 12, when the protective film 21 is properly aligned with the circular opening 12h on the table 12. Namely, FIG. 6 illustrates the situation when the film-affixing device 30 has been lowered from the position depicted in FIG. 1 so that the hub-insertion section 34A is inserted into the circular opening 12h, and the adhesive members 35a-35h provided on the bottom surface of the ring-shape board member 31 are pressed against the protective film 21. At this point, the protective film 21 is adhered to the adhesive members 35a-35h by the pressure bearing from the film-affixing device 30.

As shown in FIG. 6, when the adhesive members 35a-35h abut against the protective film 21 on the table 12, the hub-insertion section 34A completely protrudes from beneath the table 12. Therefore, the distance "h" from the upper end of the hub-insertion section 34A shown in FIG. 3, to the bottom surface of the adhesive members 35a-35h is larger than the thickness of the table 12. Here, the thickness of the protective film 21 is ignored.

For example, when the operator operates the footswitch 16 while holding the grip 33, the release sheet 20 is reeled out from the sheet-supplying portion 11 while it is wound up at the sheet-windup portion 13, so that the release sheet 20 and the protective film 21 are moved on the table 12 toward the direction designated by the arrow "A". At this time, the film-affixing device 30 on the release sheet 20, of which grip 33 is gently held by the operator, is also transported toward the direction "A" together with the release sheet 20 and the protective film 21, and the rod member 34B is moved along the inside of the guide slot 12g.

When the leading edge of the protective film 21 and the film-affixing device 30, which are being transported in the direction "A", reach the peel portion 12p of the table 12, from the position illustrated in FIG. 6, the travel of the release sheet 20 is made to travel at a right angle at the peel portion 12p. On the other hand, the adhesive members 35a-35h of the film-affixing device 30 further suspend the protective film 21 on the bottom surface of the elastic member 36, so that the protective film 21 is transported strait ahead toward the direction "A" together with the film-affixing device 30. Thereby, the protective film 21 is released from the release sheet 20. In this operation, the operator moves the film-affixing device 30 in accordance with the transportation of the release sheet 20, while keeping the bottom face of the adhesive members 35a-35h coplanar with the surface of the table 12 and supporting the grip 33.

Figure 7:
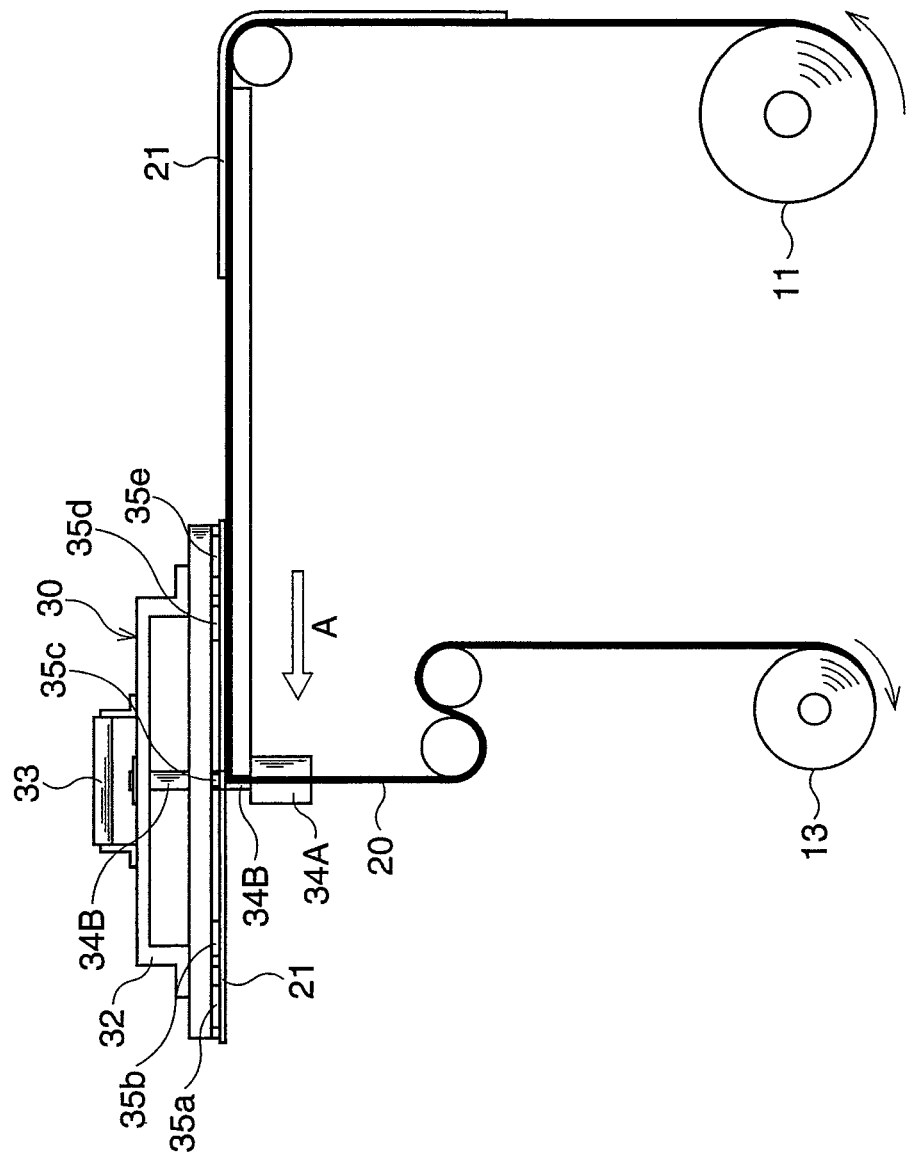
FIG. 7 schematically illustrates a side view of the film-supplying device and the film-affixing device, when the film-affixing device is moved to the position where half of the film-affixing device sticks out from the edge of the peel portion.
Figure 8:
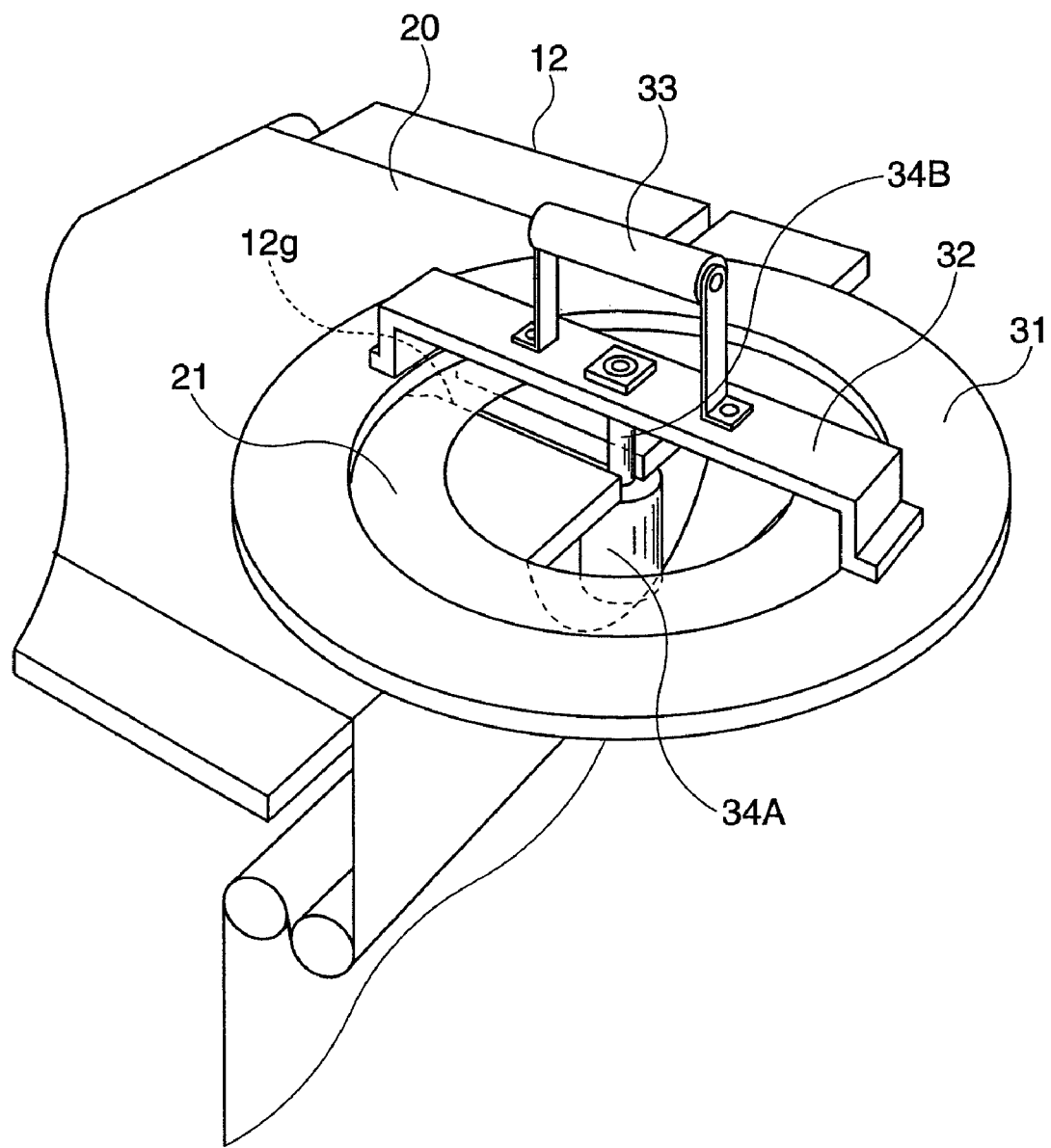
FIG. 8 is an enlarged fragmentary perspective around the alignment shaft member view of the film-supplying device and the film-affixing device illustrated in FIG. 7.

FIG. 7 schematically illustrates a side view of the film-supplying device and the film-affixing device, where the film-affixing device 30 is moved to the position where half of the film-affixing device 30 extends out from the edge of the peel portion 12p. As is apparent from FIG. 7, at this point, the alignment shaft-member 34 should pass through the release sheet 20 from the inside to the outside. In the present embodiment, the alignment shaft-member 34 passes through from the inside to the outside of the release sheet 20 through the circular area 22 provided on the release sheet 20. This scene is illustrated in FIG. 8 as an enlarged fragmentary perspective view.

The release sheet 20 is further transported and in turn the protective film 21 is completely peeled off from the release sheet 20 when the trailing edge of the film-affixing device 30 and the protective film 21 reaches the end of the peel portion 12p, so that the protective film is affixed to the film-affixing device 30.

Figure 9:
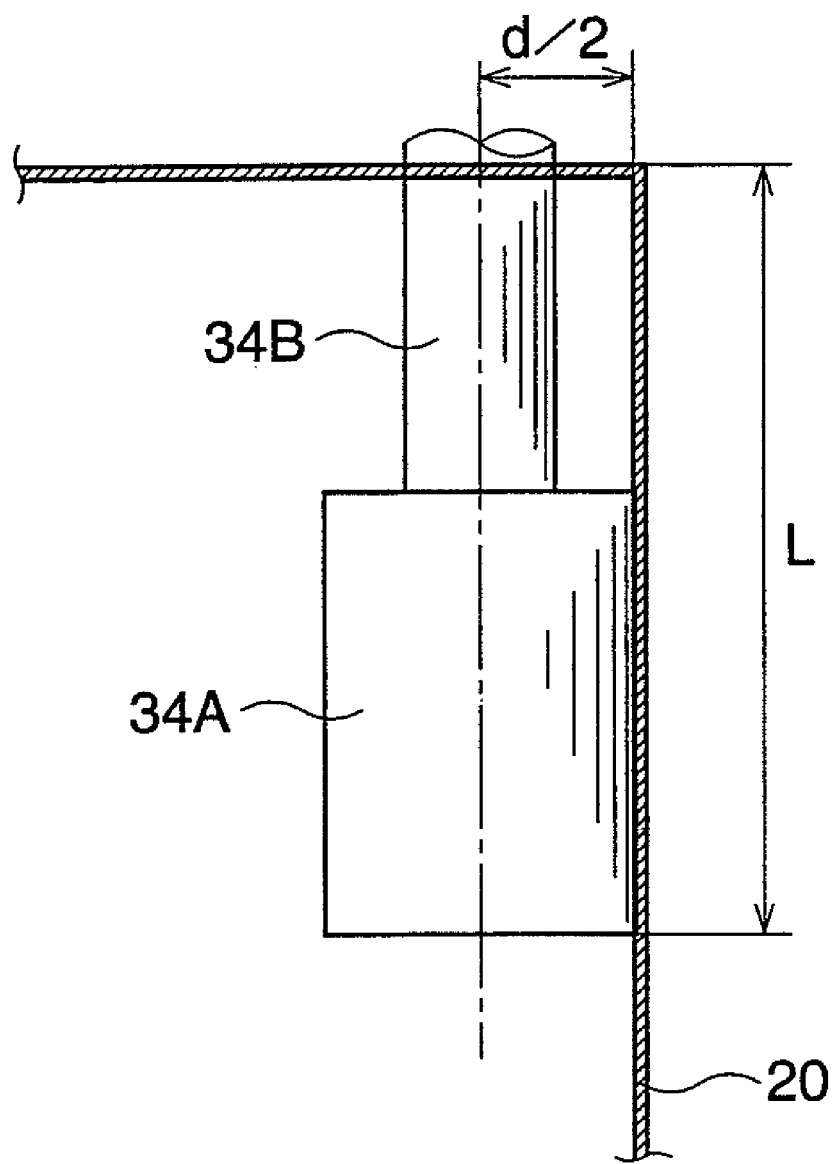
FIG. 9 is a schematic view to illustrate a condition for the alignment shaft-member to pass through the circular hole of the release sheet when the release sheet is turned by 90° at the peel portion.

Note that, the condition for the alignment shaft-member 34 to be able to pass through the cut-out hole (or the cut-out area) or the circular area 22 of the release sheet 20 is given by the formula $D/2 > d/2 + L$, with reference to FIG. 9, where "D" denotes the diameter of the circular area 22 as shown in FIG. 2, "L" denotes the length from the bottom surface of the adhesive members 35a-35h (or the surface of the protective film) to the front end of the hub-insertion section 34A as shown in FIG. 3, and "d" denotes the external diameter of the hub-insertion section 34A. Namely, in the present embodiment, when the leading peripheral end of the hub-insertion section 34A reaches the position corresponding to the end of the peel portion 12p, the lowest edge of the circular hole (circular area 22 in the present embodiment) of the release sheet 20 should have at least reached a point beyond the distance "L" downwardly from the bottom surface of the adhesive members 35a-35h.

Figure 10:
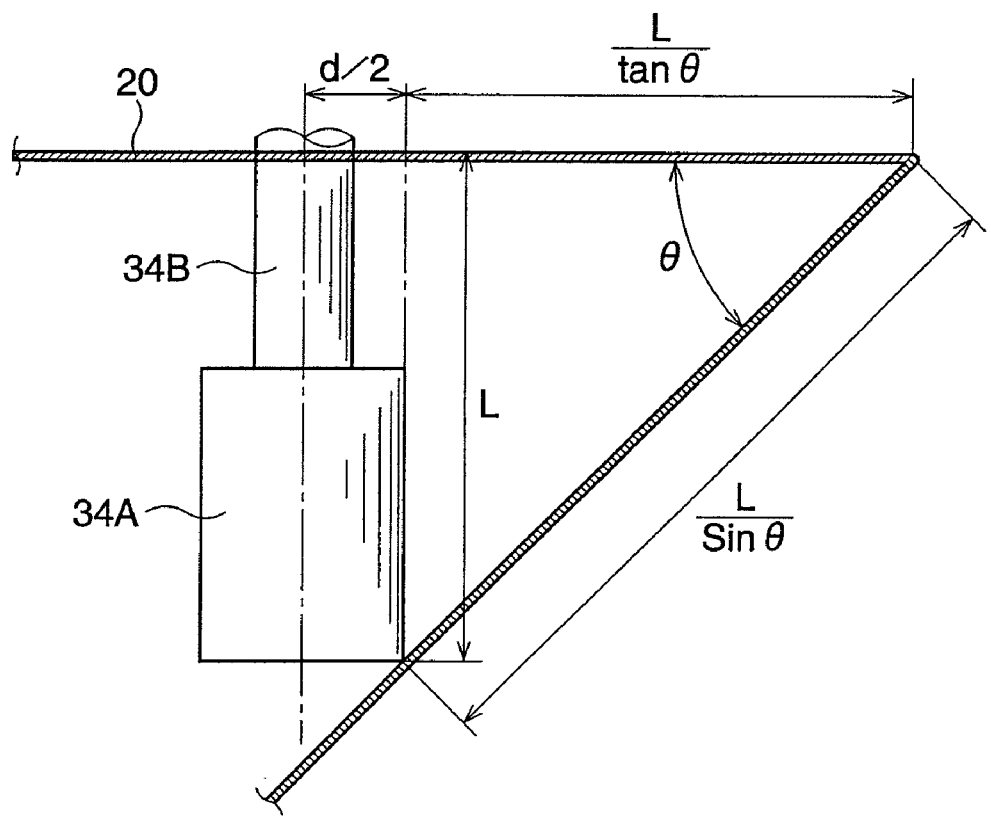
FIG. 10 is a schematic view to illustrate a condition for the alignment shaft-member to pass through the circular hole of the release sheet when the release sheet is turned by an angle of θ at the peel portion.

In the present embodiment, the release sheet 20 is substantially made to make a right-angled turn at the end of the peel portion 12p with respect to the table plane, however, the release sheet 20 may be turned by an acute angle. On this occasion, the condition for the alignment shaft-member 34 to be able to pass through the cut-out hole or the circular area 22 of the release sheet 20 is given by a formula $D/2 > d/2 + (1 + \cos\theta)L/\sin\theta$, as shown in FIG. 10, where "θ" represents the peel angle. Note that, the present embodiment corresponds to the situation when θ=90°.

In the present embodiment pressure-sensitive adhesive double coated tape was used, as an example, to affix the protective film to the ring-shape board member, however, the film-affixing implement is not restricted to that in this embodiment. For example, the protective film may be affixed to the film-affixing device by means of air suction, which may be carried out by a ring-shape suction plate with a plurality of air suction perforations.

Further, in the present embodiment, the protective film and the board member for supporting the protective film are formed as a regular ring-shape. However, the form of the film and the board member is not restricted to this regular ring-shape and any form of the interior and exterior peripheral profile can be adopted. Namely, any protective film having a cut-out area in its center and having an irregular ring-shape can be used. On this occasion, the shape of the cut-out area of the release sheet may be formed as the shape corresponding to the interior peripheral profile of the protective film. However, any shape can be adopted for the cut-out area if it can enable the alignment shaft-member to pass through the cutaway area. Further, the same is true with the opening formed in the table.

Furthermore, any other type of adhesive-film other than the pressure-sensitive adhesive-film may also be used.

Although the embodiments of the present invention have been described herein with reference to the accompanying drawings, obviously many modifications and changes may be made by those skilled in this art without departing from the scope of the invention.

The present disclosure relates to subject matter contained in Japanese Patent Application No. 2003-404-499 (filed on Dec. 3, 2003) which is expressly incorporated herein, by reference, in its entirety.

What is claimed is:

1. A film-affixing device for affixing a ring-shape adhesive-film that is attached on a release sheet onto an adherend, the device comprising:
   a film-supporting mechanism, including a ring-shape board member, that supports said ring-shape adhesive-film along a periphery of said ring-shape adhesive-film;
   an alignment shaft-member that adjusts a position of said film-affixing device with respect to said adherend; and
   a grip,
   wherein a supporting force of said film-supporting mechanism is enhanced at positions which are symmetrically located with respect to the center of the ring-shape board member, and
   wherein said film-supporting mechanism comprises a plurality of adhesive members, such that adhesive forces of at least two of said plurality of adhesive members located symmetrically in a longitudinal direction of said grip are enhanced compared to the adhesive force of the other adhesive members.

2. The film-affixing device according to claim 1, wherein the symmetrically located positions are located at an upstream-most position and a downstream-most position in a transport direction of the release sheet on the ring-shape board member.

3. The film-affixing device according to claim 1, wherein the adhesive members in the at least two of said plurality of adhesive members positioned in the longitudinal direction of said grip have a greater adhesive area than the adhesive area of the other adhesive members.

4. The film-affixing device according to claim 3, wherein the adhesive members in the at least two of said plurality of adhesive members positioned in the longitudinal direction of said grip has a T-shape and the other adhesive members have an I-shape.

5. A film-affixing device for affixing a ring-shape adhesive-film that is attached on a release sheet onto an adherend, the device comprising:
   a film-supporting mechanism, including a ring-shape board member, that supports said ring-shape adhesive-film along a periphery of said ring-shape adhesive-film;
   an alignment shaft-member that adjusts a position of said film-affixing device with respect to said adherend; and
   a grip,
   wherein a supporting force of said film-supporting mechanism is enhanced in at least one of an upstream-most position or a downstream-most position in a transport direction of the release sheet on the ring-shape board member, and
   wherein the at least one of the upstream-most position and the downstream-most position is located in a longitudinal direction of the grip.

6. The film-affixing device according to claim 5, wherein said film-supporting mechanism comprises a plurality of adhesive members, such that the adhesive force of at least one of said plurality of adhesive members located in the longitudinal direction of said grip at the at least one of the upstream-most position and the downstream-most position is enhanced compared to the adhesive force of the other adhesive members.

7. The film-affixing device according to claim 6, wherein the adhesive members in the at least one of said plurality of adhesive members positioned in the longitudinal direction of said grip has a greater adhesive area than the adhesive area of the other adhesive members.

8. The film-affixing device according to claim 7, wherein the adhesive members in the at least one of said plurality of adhesive members positioned in the longitudinal direction of said grip has a T-shape and the other adhesive members have an I-shape.

9. A film-affixing device for affixing a ring-shape adhesive-film that is attached on a release sheet onto an adherend, the device comprising:
   a film-supporting mechanism that supports said ring-shape adhesive-film along a periphery of said ring-shape adhesive-film;
   a grip; and
   an alignment shaft-member that adjusts a position of said film-affixing device with respect to said adherend;
   wherein a supporting force of said film-supporting mechanism is enhanced at a position in a longitudinal direction of the grip.

10. The film-affixing device according to claim 9, wherein said film-supporting mechanism comprises a plurality of adhesive members, such that the adhesive force of at least one of said plurality of adhesive members positioned in the longitudinal direction of said grip is enhanced compared to the adhesive force of the other adhesive members.

11. The film-affixing device according to claim 10, wherein the adhesive members in the at least one of said plurality of adhesive members positioned in the longitudinal direction of said grip has a greater adhesive area than the adhesive area of the other adhesive members.

12. The film-affixing device according to claim 11, wherein the adhesive members in the at least one of said plurality of adhesive members positioned in the longitudinal direction of said grip has a T-shape and the other adhesive members have an I-shape.

* * * * *